UNITED STATES PATENT OFFICE 2,371,545

HYDROGEN PEROXIDE BLEACH

Walter S. Riggs, Haddon Heights, N. J., and Rudolf Lehmann, Philadelphia, Pa., assignors to The Pennsylvania Salt Manufacturing Company, Philadelphia, Pa., a corporation of Pennsylvania No Drawing. Application September 26, 1942, Serial No. 459,870

4 Claims. (Cl. 252—95)

This invention relates to a relatively concentrated hydrogen peroxide having improved wetting or penetrating powers.

It is well known that when oxidizing compounds are mixed with organic materials, separate components or the entire mixture tends to decompose, on occasion with violence. Heretofore, the use of wetting agents (organic materials) with oxidizing compounds has been limited to dilute systems to avoid the formation of unstable or even dangerous mixtures.

Now, however, it has been found that certain organic wetting agents can be used with a relatively concentrated hydrogen peroxide to form mixtures that are safe and stable within practical limits (for storage and shipping purposes) of the hydrogen peroxide alone and which have superior wetting power over the hydrogen peroxide alone. When diluted to strengths commonly employed, such mixtures are safe bleaches, disinfectants or germicides, enhanced by their greater wetting power due to lower surface tension and/or interfacial tension.

The criteria for determining the suitability of any wetting agent for this purpose are that the agent should be:

(a) Resistant to oxidation and/or hydrolysis in acid media (stable in concentrated hydrogen peroxide which usually contains acid).

(b) Inert toward hydrogen peroxide (does not cause excessive decomposition of the hydrogen peroxide).

(c) Soluble in hydrogen peroxide with formation of little or no turbidity, especially at use concentrations of hydrogen peroxide.

(d) Capable of lowering the surface tension and/or forming lasting suds in hydrogen peroxide solution.

(e) Inert toward hydrogen peroxide containers.

In general; agents which satisfy these conditions belong to the classes of alcohol sulfates and alkyl aryl and/or aryl alkyl sulfonates. Other classes of agents of worth are sulfonated dicarboxylic acids, oils and sulfonated oils, and mixtures of the same.

Specific agents which may be used are: Sodium lauryl sulfates, such as "Gardinol WA," "Duponol ME," and "Duponol WA"; and alkylated benzene or naphthalene sulfonates such as "Santomerse No. 2" and sulfonates of the condensation product of benzene and chlorinated kerosene, such as "Nacconol NR."

These particular agents appear to promote attack on aluminum, hence hydrogen peroxide mixtures with them are best stored and shipped in glass containers. Agents suitable for use with hydrogen peroxide in aluminum containers are of the classes of sulfonated petroleum products, such as "Ultrawet" and sulfonated dicarboxylic acids, such as diamyl ester of sulfonated succinic acid "Areosol AY" and dioctyl ester of sulfonated succinic acid "Aerosol OT."

The particular wetting agent and the quantity added to the hydrogen peroxide depend upon the concentration of the hydrogen peroxide, the nature of the storage container, the quantity and nature of the other components of hydrogen peroxide (usually residual sulfuric acid, a stabilizer and water), the solubility of the agent in the system, and the desired degree of wetting or surface tension reduction. If excessive foaming during handling or shipment occurs, foam suppressing agents may be added to the concentrated mixture. Such agents are generally higher alcohols, such as heptadecanol or capryl alcohol, and are added in such small quantities (usually less than 0.1% by weight) that they are ineffective when the hydrogen peroxide mixture is diluted for use.

An example of a mixture prepared according to this invention is 100 volume hydrogen peroxide containing, in addition to its usual components, 3.0 g. p. l. of sodium lauryl sulfate ("Gardinol WA").

In a test at 100° F. for 155 days, the hydrogen peroxide, of this composition, had decomposed to an extent only 6% greater than had it been alone. On dilution, it had a surface tension of 58–33 dynes/cm. for concentrations of 0.5–100 volume per cent and held suds for 2–24 hours.

Obviously, when more wetting agent is added to the hydrogen peroxide solution, there will result, upon dilution, a solution having a still lower surface tension. If a more dilute solution of hydrogen peroxide is used to make up the composition of this invention, correspondingly smaller quantities of wetting agent will allow formation of the desired solutions of concentrations commonly used.

It will be understood by those skilled in the art that we have proceeded contrary to general teachings by mixing organic materials with concentrated hydrogen peroxide, and that the essence of our invention lies in forming mixtures of concentrated hydrogen peroxide of substantially 100 volume hydrogen peroxide, with wetting agents to give products having enhanced bleaching, germicidal, disinfecting, and deodorant powers in use concentrations; and that our invention is not limited to any set proportions of wetting agents and/or hydrogen peroxide concentrations.

We claim:

1. A composition consisting essentially of substantially 100 volume hydrogen peroxide and a small amount of a wetting agent selected from the group of wetting agents consisting of lauryl sulfates, alkylated benzene sulfonates, alkylated naphthalene sulfonates, sulfonates of the condensation product of benzene and chlorinated kerosene, and diamyl and dioctyl esters of sulfonated succinic acid, said amount being sufficient upon dilution of the composition in water to bleaching concentrations to yield a final bleaching solution having the desired surface tension.

2. The composition of claim 1 to which has been added heptadecanol as a foam suppressing agent.

3. The composition of claim 1 to which has been added capryl alcohol as a foam suppressing agent.

4. A composition consisting essentially of substantially 100 volume hydrogen peroxide and three grams oper litre of sodium lauryl sulfate.

WALTER S. RIGGS.
RUDOLF LEHMANN.